J. Ashcroft,
Treating Coffee.
No. 113,832.  Patented Apr. 18, 1871.
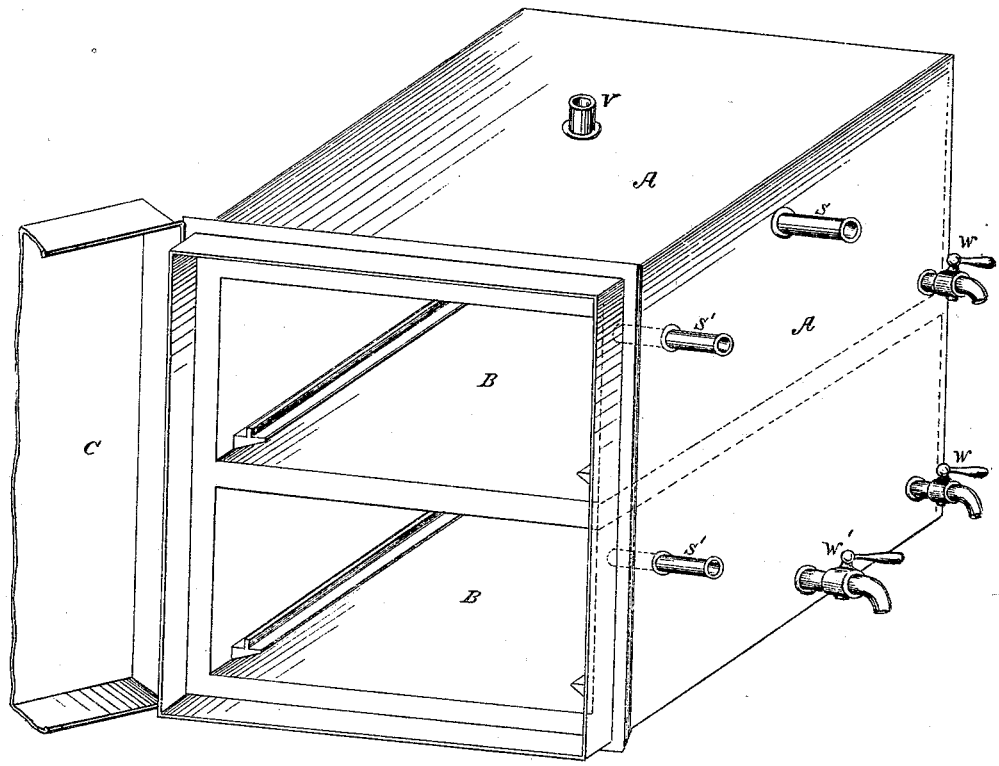
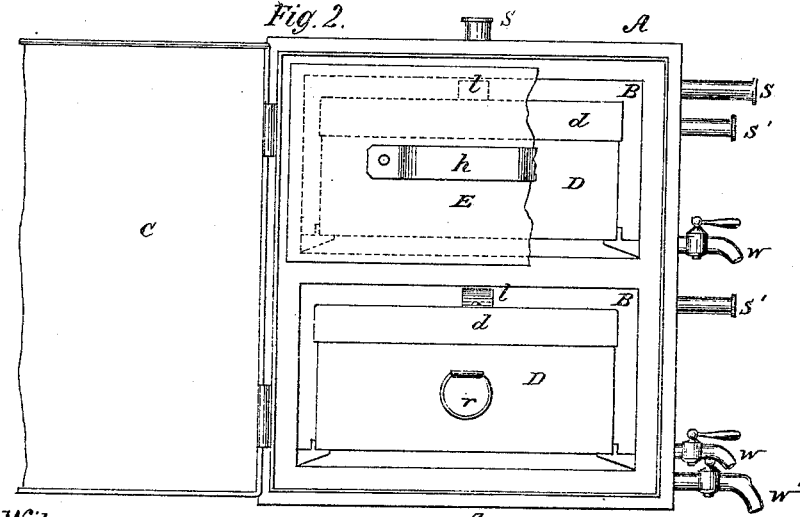
Witnesses:
Fred. Artis
Samuel E. Day
Inventor:
John Ashcroft 2 Sheets—Sheet 2.
John Ashcroft.
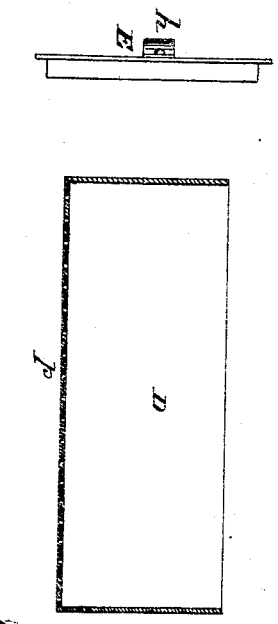
Fig. 3.
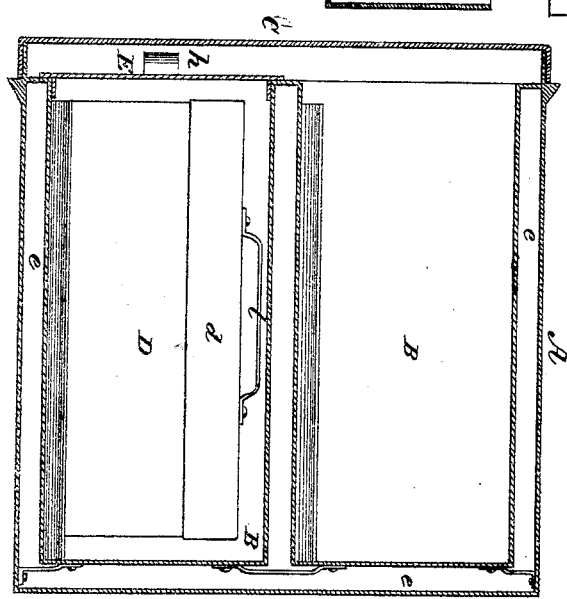
Fig. 4.
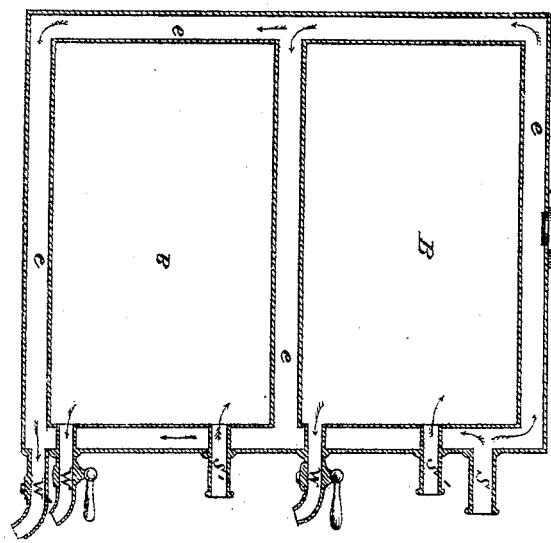
Witnesses:
Fred Notes
Samuel E. Gray
Inventor:
John Ashcroft

UNITED STATES PATENT OFFICE.

JOHN ASHCROFT, OF BROOKLYN, NEW YORK, ASSIGNOR TO SARAH JANE ASHCROFT, OF SAME PLACE.

IMPROVEMENT IN APPARATUS AND PROCESSES FOR TREATING COFFEE.

Specification forming part of Letters Patent No. 113,832, dated April 18, 1871.

I, JOHN ASHCROFT, of Brooklyn, in the county of Kings and State of New York, have invented a new and useful Apparatus for Treating the Raw Coffee-Berry Chemically, Coloring and Maturing it, of which the following is a specification:

Nature and Objects of the Invention.

It is well known to importers of certain kinds of coffee that its value is increased in proportion to the yellowness or brownness of its color, showing maturity. Coffee when first shipped is generally of a pale-green color and of a soggy appearance, but on arrival in this or other countries sometimes turns out of a very handsome yellow, brown, or golden color, and of matured appearance, which materially increases its commercial and other value.

It has been ascertained that the vessels which have turned out the brownest and most matured coffee on arrival at their destined port are those which have experienced the longest and stormiest voyages, and which have been obliged by stress of weather to keep the hatches closely battened down, thus keeping the coffee entirely without ventilation, so that, in consequence of the warmth produced by close confinement in the hold of the vessel, it becomes gradually heated, and its color changed thereby from the pale-green to more or less of the yellow or brown color, according to the length of the voyage and consequent confinement of the coffee.

On the other hand, those vessels which have made quick voyages, with fair weather, and have been open during the passage and well ventilated, have invariably turned out the coffee in nearly the same condition as to color and matured appearance as when originally shipped.

Coffee, when thoroughly colored, browned, or matured, is much more valuable to commerce than pale coffees, which contain heavy green berries, which do not roast evenly, and also give out a bitter taste; hence my apparatus is to accomplish rapidly what it otherwise takes a long time or lapse of years to accomplish, and with a large percentage of gain, and by my process there is less loss in weight and shrinkage, none of the essential properties of the coffee being destroyed, all the coffee-grains being evenly colored and uniformly dry, presenting no unevenness, and not requiring so many different processes when prepared for use as there are numbers of packages. The coffee is greatly improved in appearance and drinking qualities, making it more desirable both to those who deal in it in the raw state, and also to those who prepare it for final consumption.

The process of sweating, coloring, and maturing coffee, which increases its commercial value, is well known to importers. When a cargo is dampened by water or moisture it heats and sweats, thus imparting to the coffee a rich yellow color. The manner in which I treat unmatured coffee has this much-desired result and greatly enhances its value, as has been proved by experiment.

In Arabia coffee ripens fully on the trees. It is shaken off, dried in the shade, and is of a superior quality, the small berries attaining their seasoning in some three years. East and West India coffee is cured by exposing layers of the fruit several inches thick to the heat of the sun, so that fermentation takes place. The worst coffee in America will, in from ten to fourteen years, become as good and acquire as high a flavor as the best we now have from Turkey.

My process in a measure disperses the fragrant volatile oil called "caffeine" from near the outer shell through the solid substance, thus enabling the raw bean to be exposed to the atmosphere with less detriment. Raw coffee is liable to be damaged by absorbing the odors of other substances, such as sugar, spices, &c., and when so damaged my process remedies the injury and restores the coffee to its natural condition, in addition to the desirable coloring and maturing.

In the drawing, Figure 1 is a perspective view of my apparatus, the outer door being shown in broken section, the sweating-boxes of the ovens and their lids being removed. Fig. 2 is a front view of same, showing a part of the front hinged door and a part of one of the lids of the ovens. Fig. 3 is a longitudinal section, and Fig. 4 a transverse section, of my apparatus.

A indicates the outer shell or frame, which may be made of metal or any other suitable material, and which may have on its outer side any additional non-conducting material. B represents compartments, around which steam circulates, which is admitted through a pipe or pipes, s. D represents sweating-boxes, having perforated bottoms p for the admission of steam when desired to be let into the compartments B through the pipes s', which enter said compartments.

The steam-pipes s and s' may have valves or stop-cocks attached, by which to regulate the quantity of steam to be used in heating the space e or in the compartments B, there to have direct contact with the coffee in the sweating-boxes D through the perforations in them, which may be in any part of the same, but preferably the bottom.

E represents the lids or doors of the compartments or sweating-ovens B. These have handles h, and the sweating-boxes D have also handles l attached to their lids d, and rings or other handles r enable the boxes to be easily handled.

C is a hinged door or lid covering the ovens B, their lids E, and the sweating-boxes D; this to economize heat, prevent as much radiation as possible, as well as evaporation of the aroma of the coffee-berry.

W represents valves or water-cocks, whereby to draw off the water from the ovens or compartments B resulting from the condensation of steam in the heating chamber or jacket e. V represents any ordinary safety-valve, a precautionary appliance in case the pressure of the steam in chamber e should become too high.

By applying direct steam in proper quantities through pipes s' into compartments B, which enters the sweating-boxes D through their perforated bottoms p, supplying the desired moisture to produce sweating, aided by the outward heat in chamber e, the sweating, coloring, and maturing process is thus accomplished in from one to four days, instead of so many years, the economy of which is palpable.

Damaged cargoes of coffee can be saved by my process to a great extent. I can carry out the same principle on a large scale by taking rooms or halls of any desirable size, supplying the moistening steam for sweating and other heat for drying by means of pipes or otherwise. In this way, having tiers of shelves in a room covered with bags of coffee, ventilation cut off, and into which room or rooms steam can be introduced, also dry heat, by means of coils of pipe or otherwise, I can cure a whole cargo of coffee at a time, producing a desired chemical result in a short time.

Having thus described my invention, what I claim as new, and desire to secure by Letters Patent of the United States, is—

1. The process of sweating, coloring, and maturing the raw coffee-berry in the manner substantially as herein shown and described.

2. The perforated sweating-boxes D, substantially as herein shown and described.

3. In combination with said boxes, the apparatus A, with its doors, lids, and steam and water pipes, arranged and operating in the manner substantially as shown and described.

JOHN ASHCROFT.

Witnesses:
   S. S. FAHNESTOCK,
   S. B. ROANE.